B. DAHL.
MEANS FOR MOUNTING PUNCTURELESS TIRES ON WHEEL RIMS.
APPLICATION FILED OCT. 5, 1911.
1,043,208.
Patented Nov. 5, 1912.
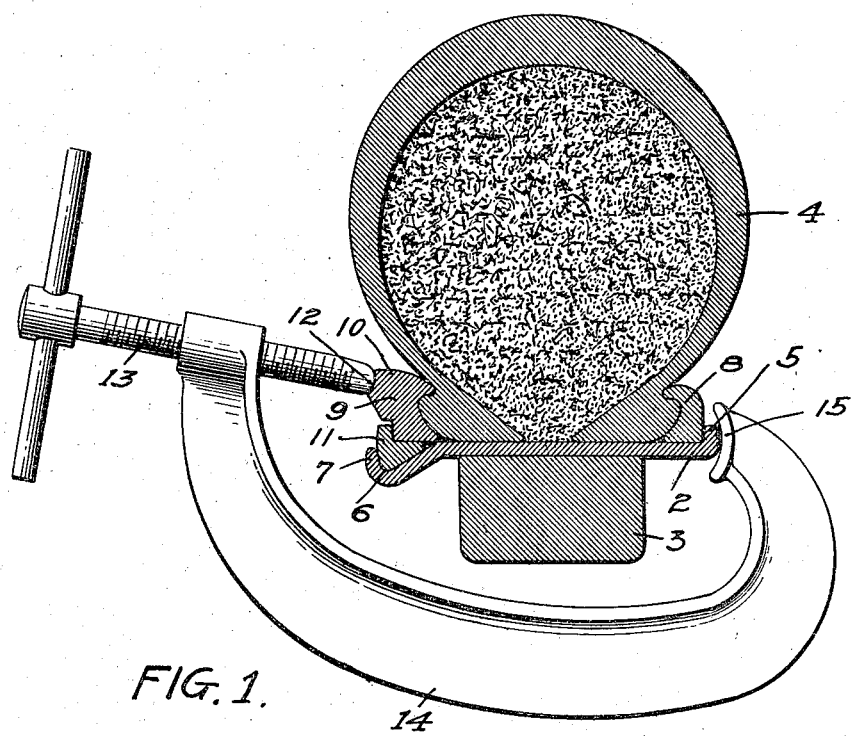
FIG. 1.
FIG. 2.
FIG. 3.
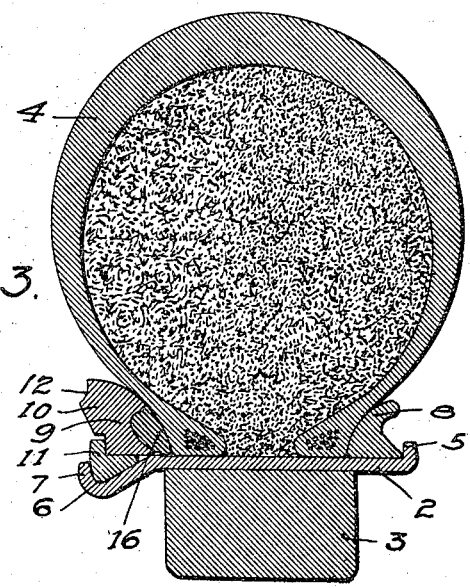
FIG. 4.
WITNESSES
M. R. McInnis
E. A. Paul
INVENTOR
BENJAMIN DAHL
BY Paul & Paul
HIS ATTORNEYS

UNITED STATES PATENT OFFICE.

BENJAMIN DAHL, OF MINNEAPOLIS, MINNESOTA.

MEANS FOR MOUNTING PUNCTURELESS TIRES ON WHEEL-RIMS.

1,043,208.            Specification of Letters Patent.        Patented Nov. 5, 1912.

Application filed October 5, 1911. Serial No. 653,051.

*To all whom it may concern:*

Be it known that I, BENJAMIN DAHL, of Minneapolis, Hennepin county, Minnesota, have invented certain new and useful Improvements in Means for Mounting Punctureless Tires on Wheel-Rims, of which the following is a specification.

This invention relates to punctureless tires in which a filler of yielding, gelatinous material is employed and put under compression when the casing is mounted on the wheel rim.

Generally in pneumatic tires the bead or locking ring may be forced into place with the hands without the use of any compressing means, but where a filler is used that is put under compression by drawing together the edges of the casing it has been found that the clamping means cannot be applied to the ordinary bead without bending or buckling it to such an extent that difficulty is experienced in putting the filler under compression.

The object, therefore, of my invention is to provide a bead of such construction that a suitable number of clamps may be applied thereto and the filler squeezed to fill the casing without twisting or bending the bead out of shape.

My invention consists generally in the improved form of bead hereinafter shown and described.

In the accompanying drawings forming part of this specification, Figure 1 is a detail sectional view illustrating the manner of applying the clamp to a tire containing a punctureless filler, Fig. 2 is a perspective view of a portion of the bead, Fig. 3 is a detail sectional view showing the invention applied to another form of tire, Fig. 4 is a perspective view of a portion of the bead in its modified form, as used with the tire casing shown in Fig. 3.

In the drawing, 2 represents the metal rim of the wheel, 3 the felly and 4 the outer casing of the tire. The rim has a flange or rib 5 on one edge and an annular depression 6 in its opposite edge terminating in a flange 7. A bead 8 is seated against the rib 5 and engages the edge of the tire casing in the usual way, being grooved to receive the bead on the edge of the casing. On the other side of the tire a bead 9 is provided, grooved to fit the bead of the casing and also having on its outer surface an annular boss 10 which serves to strengthen and stiffen the bead against bending or buckling when under pressure.

11 is a split locking ring which is adapted to be inserted between the bead 9 and the flange 7 to lock the parts together. The boss 10 preferably has a grooved outer face 12 to form a seat for a screw 13 that is carried by a frame 14 which extends across the plane of the wheel, as shown in Fig. 1, and is provided with a fixed jaw 15 to engage the flange 5. Generally the beads and the locking ring may be forced into place by hand, in the case of a pneumatic tire, but where the punctureless filler is employed and the edges of the casing must be drawn together to squeeze the filler sufficiently so that it will entirely fill the space inclosed by the casing, it is necessary to use a clamp or a series of them to put the filler under sufficient compression to allow the locking ring to be slipped into its seat. This I have been able to accomplish by means of the annular boss on the bead 9 having a seat to receive the screw or movable jaw 13.

In Fig. 3 a slightly modified construction is shown, in which the groove in the inner face of the bead 9 is filled with some suitable material to present a rounded surface to fit the curved surface of the casing. This bead I will designate by the reference numeral 16. It is equipped with a boss, as described with reference to Fig. 1, and the compression of the filler is obtained in substantially the same manner.

I do not wish to be confined to the form of the bead employed or the shape of the boss, as both are capable of modification without departing from the spirit of my invention.

I claim as my invention:—

The combination with a wheel rim adapted to be used with an outer casing having a filler of yielding material within the same, of beads arranged to engage said casing to force the edges thereof together and compress the filler, one of said beads having a strengthening rib or boss formed thereon, the outer surface of said rib or boss having a seat to receive a clamping screw, and a locking ring adapted to be inserted between said reinforced bead and said rim.

In witness whereof, I have hereunto set my hand this 25" day of September 1911.

BENJAMIN DAHL.

Witnesses:
GENEVIEVE E. SORENSEN.
EDWARD A. PAUL.

Copies of this patent may be obtained for five cents each, by addressing the "Commissioner of Patents, Washington, D. C."